(12) United States Patent
Fujii et al.

(10) Patent No.: US 8,310,802 B2
(45) Date of Patent: Nov. 13, 2012

(54) METALLIZATION FILM CAPACITOR HAVING DIVIDED ELECTRODE WITH FUSE

(75) Inventors: Hiroshi Fujii, Toyama (JP); Takuya Kyouda, Toyama (JP); Hiroki Takeoka, Osaka (JP)

(73) Assignee: Panasonic Corporation, Osaka (JP)

( * ) Notice: Subject to any disclaimer, the term of this patent is extended or adjusted under 35 U.S.C. 154(b) by 437 days.

(21) Appl. No.: 12/279,860

(22) PCT Filed: Aug. 27, 2007

(86) PCT No.: PCT/JP2007/066514
§ 371 (c)(1),
(2), (4) Date: Aug. 19, 2008

(87) PCT Pub. No.: WO2008/026526
PCT Pub. Date: Mar. 6, 2008

(65) Prior Publication Data
US 2010/0226065 A1    Sep. 9, 2010

(30) Foreign Application Priority Data
Aug. 28, 2006    (JP) .................................. 2006-230078

(51) Int. Cl.
*H01G 2/00* (2006.01)
*H01G 4/08* (2006.01)
(52) U.S. Cl. ..................... 361/275.4; 361/323
(58) Field of Classification Search ............... 361/275.4, 361/323, 304, 309, 301.5, 272, 303, 311, 361/305, 373, 273
See application file for complete search history.

(56) References Cited

U.S. PATENT DOCUMENTS

| | | | | |
|---|---|---|---|---|
| 2,216,558 A * | 10/1940 | Ortlieb | ........................ | 361/275.4 |
| 3,206,661 A * | 9/1965 | Blank | ............................ | 361/303 |
| 4,345,298 A | 8/1982 | Grahame | | |
| 4,433,359 A * | 2/1984 | Hamabe et al. | ................ | 361/273 |
| 4,547,832 A * | 10/1985 | Lavene | ......................... | 361/307 |
| 5,168,421 A * | 12/1992 | Suzuki et al. | .................. | 361/323 |
| 6,370,008 B1 * | 4/2002 | Vetter | ............................ | 361/273 |
| 6,631,068 B1 * | 10/2003 | Lobo | ............................. | 361/273 |

(Continued)

FOREIGN PATENT DOCUMENTS

JP        57-87116        5/1982

(Continued)

OTHER PUBLICATIONS

Machine Translation of JP05082389A (Kuniya).*

(Continued)

*Primary Examiner* — David M Sinclair
(74) *Attorney, Agent, or Firm* — McDermott Will & Emery LLP

(57) ABSTRACT

A metallization film capacitor that achieves both high heat resistance and high withstand voltage at the same time. A metal-deposited electrode is formed on a PEN film in each of a pair of metalized films. These metalized films are wound such that the metal-deposited electrodes face each other via the dielectric film in between. A metalized contact electrode is formed on both end faces of these wound metalized films to configure the metallization film capacitor. A divisional electrode is provided on the metal-deposited electrode. In addition, a fuse is coupled to this divisional electrode for providing a self-maintaining function. Pass rate a/b of a deposition pattern is set to 4.0 or smaller, where 'a' is the fuse width, and 'b' is the length of the divisional electrode in a lengthwise direction of the metalized films.

7 Claims, 5 Drawing Sheets

U.S. PATENT DOCUMENTS

| | | | |
|---|---|---|---|
| 6,788,182 B2 * | 9/2004 | Young et al. | 336/200 |
| 7,092,238 B2 * | 8/2006 | Saito et al. | 361/329 |

FOREIGN PATENT DOCUMENTS

| JP | 63-10515 | | 1/1988 |
|---|---|---|---|
| JP | 04123414 A | * | 4/1992 |
| JP | 5-4450 U | | 1/1993 |
| JP | 05082389 A | * | 4/1993 |
| JP | 06069069 A | * | 3/1994 |
| JP | 07142284 A | * | 6/1995 |
| JP | 08222477 A | * | 8/1996 |
| JP | 08-250367 | | 9/1996 |
| JP | 8-250367 | | 9/1996 |
| JP | 2000012368 A | * | 1/2000 |
| JP | 2000114089 A | * | 4/2000 |
| JP | 2001-052953 | | 2/2001 |
| JP | 2005-093515 | | 4/2005 |
| JP | 2005093761 A | * | 4/2005 |
| JP | 2005303225 A | * | 10/2005 |
| JP | 2006-093689 | | 4/2006 |

OTHER PUBLICATIONS

Japanese Office Action, and English translation thereof, issued in Japanese Patent Application No. 2008-532045 dated Jun. 19, 2012.

* cited by examiner

METALLIZATION FILM CAPACITOR HAVING DIVIDED ELECTRODE WITH FUSE

RELATED APPLICATIONS

This application is the U.S. National Phase under 35 U.S.C. §371 of International Application No. PCT/JP2007/066514, filed on Aug. 27, 2007, which in turn claims the benefit of Japanese Application No. 2006-230078, filed on Aug. 28, 2006, the disclosures of which Applications are incorporated by reference herein.

TECHNICAL FIELD

The present invention relates to metallization film capacitors employed in a range of electronic devices, electrical equipment, industrial equipment, and vehicles, and more particularly to metallization film capacitors suitable for smoothing, filtering, and snubbing in motor-driving inverter circuits of hybrid vehicles.

BACKGROUND ART

Inverter circuits are increasingly being used to control a wide variety of electrical equipment to conserve energy and achieve high efficiency from the viewpoint of environmental protection. In particular, in the car industry, the development of technologies for conserving energy and improving efficiency to reduce impact on global environment continues to gather momentum. This includes commercialization of hybrid electric vehicles (hereinafter referred to as HEVs) powered by an electric motor plus a gasoline engine.

The service voltage range of the electric motor for these HEVs is as high as several hundred volts, and thus metallization film capacitors are of increasing interest for use in these electric motors due to their high withstand voltage and low loss. In addition, metallization film capacitors have an extremely long service life, so they also tend to be adopted on the market for reasons of low maintenance.

For use in vehicles, high heat resistance and high withstand voltage are needed in metallization film capacitors, and thus a range of developments and proposals have been made with this goal in mind.

FIG. 4 is a perspective view of a structure of a conventional metallization film capacitor. As shown in FIG. 4, first metalized film 21 is configured by metalizing the surface of first dielectric film 22, typically a polypropylene film, with electrode film 23. Electrode film 23 is not formed on margin 22a. Electrode film 23 is not also formed on cross-shaped first slit 22b. Segments 23a, which are unit capacitors whose functional area is segmented, are each connected to first fuse 23b. Second fuse 23c couples the deposited electrodes on functional areas separated by second slit 22c to deposited electrodes on electrode lead-out areas. Second slit 22c, on which no electrode film is formed, extends lengthwise along the film.

Second metalized film 24 includes second dielectric film 25, margin 25a, cross-shaped first slit 25b, second slit 25c, electrode film 26, segment 26a, first fuse 26b, and second fuse 26c, the same as the first metalized film. In addition, this metallization film capacitor has metal-sprayed portions 27 and 28 for lead-outs.

In a conventional metallization film capacitor as configured above, multiple single-element capacitors form numerous unit capacitors, and a fuse is provided between unit capacitors and between the functional area of capacitor and the electrode lead-out area. If any abnormality arises, the function of the capacitor is secured by the fuse blowing to minimize capacity reduction without causing insulation breakdown. Even in an abnormality in which short-circuit current caused by insulation breakdown cannot be shut off by the first fuse, the functional area of the capacitor and the electrode lead-out area can be cut off by the second fuse so as to reliably avoid a short-circuit failure. This significantly improves reliability against insulation breakdown. Accordingly, a small and light capacitor with significantly improved reliability with respect to insulation performance can be provided, compared to the conventional capacitor.

Prior art related to the present invention is typically disclosed in Patent Document 1.

An electrode pattern formed by metal deposition in the above conventional metallization film capacitor significantly improves reliability against insulation breakdown by the fuse blowing if an abnormality occurs so that insulation breakdown can be prevented, minimizing capacity reduction. However, the heat resistance of a conventional metallization film capacitor is low (about 110° C.) because it generally uses a polypropylene film (hereafter referred to as a "PP film") for its dielectric film. This does not achieve resistance to the high temperature (150° C.) needed for vehicles.

To improve heat resistance, one method is to use a dielectric film containing an inorganic filler, such as polyethylene naphthalate (hereafter referred to as "PEN"), polyphenylene sulfate (hereafter referred to as "PPS"), and polyethylene terephthalate (hereafter referred to as "PET"). However, if a PEN film is used, sufficient heat resistance is achieved, but the withstand voltage is low. Performance of withstand voltage is not sufficient even if electrode patterns are formed by metal deposition, a technology built on the use of conventional PP film.

Patent Document 1: Japanese Patent Unexamined Publication No. H8-250367.

SUMMARY OF THE INVENTION

The present invention solves the above disadvantage of the prior art, and offers a metallization film capacitor that can achieve both high heat resistance and high withstand voltage at the same time, compared to the conventional metallization film capacitor using a PP film.

To solve the disadvantage, the present invention includes an element and a metalized contact electrode formed by spraying metal on both end faces of this element. The element is configured by stacking or winding a pair of metalized films, in which a metal-deposited electrode is formed on a dielectric film containing inorganic filler, in a way such that the metal-deposited electrodes face each other via the dielectric film. A divisional electrode is provided on at least one of the metal-deposited electrodes on the pair of metalized films. This divisional electrode is coupled to a fuse so that a self-maintaining function can be provided. In addition, pass rate a/b of a deposition pattern is set to 4.0 or smaller, where 'a' is a width of the fuse and 'b' is a length of divisional electrode in a lengthwise direction of the metalized films.

The metallization film capacitor of the present invention is configured to achieve deposition pattern pass rate a/b of not greater than 4.0, where 'a' is the width of the fuse and 'b' is the length of divisional electrode in the lengthwise direction of the metalized film. In other words, a narrower fuse and a wider divisional electrode can cut off an area by pinpointed evaporation of the metal-deposited electrode by less energy in the metallization film capacitor configured with the metal-deposited electrode on the dielectric film containing inorganic filler. Accordingly, the present invention achieves better self-maintaining performance, and better withstand voltage.

Figure 1:
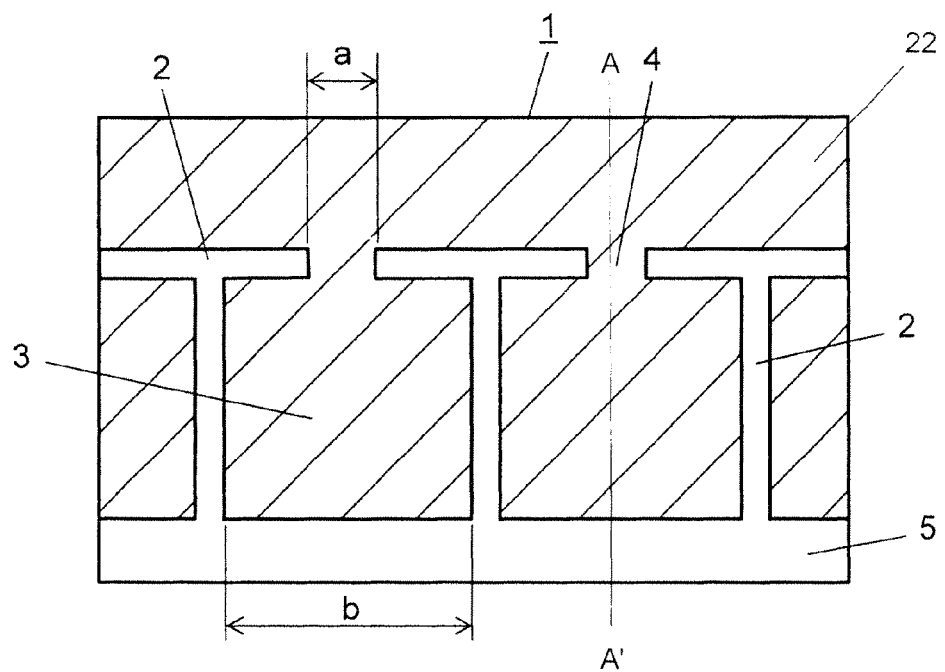
FIG. 1 is a plan view of a key part illustrating a structure of a metalized film used in a metallization film capacitor in accordance with a first exemplary embodiment of the present invention.

| REFERENCE MARKS IN THE DRAWINGS | |
|---|---|
| 1 | Metalized film |
| 2 | Slit |
| 3 | Divisional electrode |
| 4 | Fuse |
| 5, 9 | Margin |
| 6 | First metalized film |
| 7, 11 | Low resistance portion |
| 8 | Second metalized film |
| 10 | Metal-deposited electrode |
| 12 | Element |
| 13 | Core |
| 13a | Wrinkling of core |

DETAILED DESCRIPTION OF PREFERRED EMBODIMENTS

First Exemplary Embodiment

The first exemplary embodiment of the present invention is described below.

Figure 5:
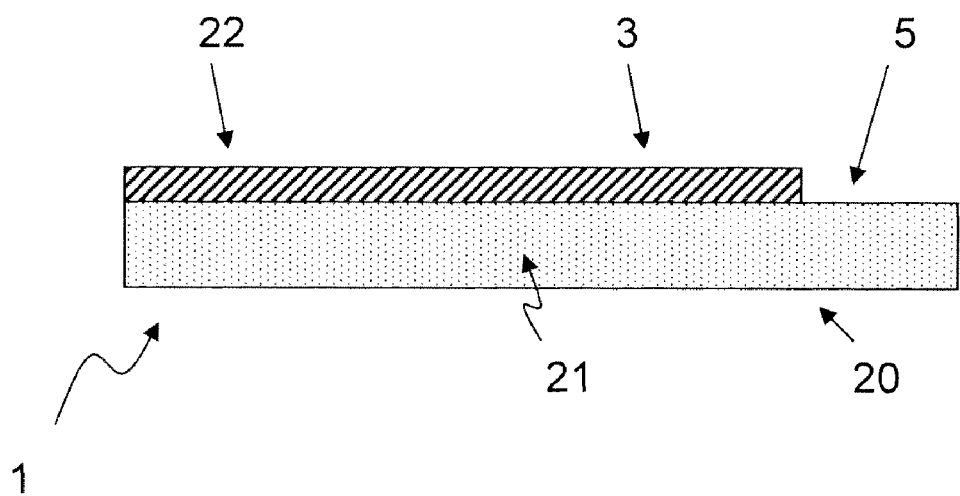
FIG. 5 is a cross sectional view of the A-A line of FIG. 1.

FIG. 1 is a plan view of a key part illustrating a structure of a metalized film used in a metallization film capacitor in the first exemplary embodiment of the present invention, and FIG. 5 is a cross sectional view of the A-A line of FIG. 1. In FIG. 1, metalized film 1 includes a strip of polyethylene naphthalate film 20 containing inorganic filler 21 (hereafter referred to as a "PEN" film) 2.0 µm thick and 30 mm wide as a dielectric film. Slit 2, which is a non-metal deposited portion, is provided on a surface of this PEN film, and aluminum metal-deposited electrodes are formed to create multiple divisional electrodes 3. These divisional electrodes 3 are coupled in parallel by using fuse 4. Metalized film 1 also includes margin 5, which is a non-metal deposited portion. Further, the metal-deposited electrode includes a current collective portion 22.

A pair of metalized films 1 as configured above are wound such that the metal-deposited electrodes face each other via the dielectric film in between to form an element. Metal spraying is applied to both end faces of this element to form metalized contact electrodes. This completes the metallization film capacitor in the first exemplary embodiment.

In metalized film 1 as configured above, a pass rate of a deposition pattern is defined as ratio a/b, where 'a' is a width of fuse 4 and 'b' is a length of divisional electrode 3 in a lengthwise direction of metalized film 1. Table 1 shows the withstand voltage characteristic of the capacitor confirmed when this pass rate a/b is changed.

TABLE 1 n = 10

| Sample No. | a: Fuse | b: Divisional electrode (mm) | a/b: pass rate (%) | Initial withstand voltage yield | Stepped voltage rise test ΔC = −5% Compared to No. 4 | Stepped voltage rise test ΔC = −97% Compared to No. 4 | Evaluation |
|---|---|---|---|---|---|---|---|
| 1 | 0.2 | 1 | 20 | 0/10 | Short circuit | Short circuit | bad |
| 2 | 0.2 | 2 | 10 | 2/10 | Short circuit | Short circuit | bad |
| 3 | 0.2 | 3 | 6.7 | 4/10 | 0.78 | Short circuit | bad |
| 4 | 0.2 | 5 | 4.0 | 8/10 | 1 | 1 | good |
| 5 | 0.2 | 10 | 2.0 | 9/10 | 1 | 0.96 | good |
| 6 | 0.2 | 20 | 1.0 | 10/10 | 1.11 | 0.92 | good |
| 7 | 0.2 | 30 | 0.7 | 10/10 | 1.22 | 0.83 | Very good |
| 8 | 0.2 | 40 | 0.5 | 10/10 | 1.22 | 0.79 | very good |
| 9 | 0.2 | 50 | 0.4 | 10/10 | 1.11 | 0.67 | good |
| 10 | 0.2 | 60 | 0.3 | 10/10 | 1 | 0.58 | good |

The capacity of each of prepared metallization film capacitors is 100 μF. An initial withstand voltage yield test is conducted on 10 pieces in the state of metalized film. In a stepped voltage rise test, the applied voltage is increased after a predetermined time at an ambient temperature of 120° C. Voltages when the capacity becomes −5% and −97% are checked. The pass rate in sample No. 4 is that of the metal deposition pattern mainly formed in a conventional capacitor using a PP film for the dielectric film.

It is apparent from Table 1 that the metallization film capacitor in the first exemplary embodiment shows good initial withstand voltage yield when pass rate a/b of the metal-deposited electrode formed on metalized film 1 using the PEN film for the dielectric film is set to 4.0 or smaller. These metallization film capacitors also demonstrate a withstand voltage characteristic equivalent to or higher than that of the conventional capacitor using PP film for the dielectric film. In particular, when pass rate a/b is 1.0 or smaller, the metallization film capacitor in the first exemplary embodiment demonstrates a further significant effect. However, improvement in the withstand voltage characteristic peaks at pass rate a/b of 0.3. Accordingly, pass rate a/b is set to 4.0 or smaller, and preferably between 1.0 and 0.4.

Next, the withstand voltage characteristic of the capacitor is confirmed in samples No. 6 to No. 9, whose pass rate a/b is between 1.0 and 0.4, when the resistance of the metal-deposited electrode is changed. Tables 2 and 3 show the results.

TABLE 2 n = 10

| Sample No. | a: Fuse (mm) | b: Divisional electrode (mm) | a/b: pass rate (%) | Initial withstand voltage yield | Stepped voltage rise test ΔC = −5% Compared to capacitor with general resistance | Stepped voltage rise test ΔC = −97% Compared to capacitor with general resistance |
|---|---|---|---|---|---|---|
| 6 | 0.2 | 20 | 1.0 | 10/10 | 1.4 | 1.18 |
| 7 | 0.2 | 30 | 0.7 | 10/10 | 1.36 | 1.25 |
| 8 | 0.2 | 40 | 0.5 | 10/10 | 1.27 | 1.26 |
| 9 | 0.2 | 50 | 0.4 | 10/10 | 1.4 | 1.31 |

TABLE 3 n = 10

| Sample No. | a: Fuse (mm) | b: Divisional electrode (mm) | a/b: pass rate (%) | Initial withstand voltage yield | Stepped voltage test ΔC = −5% Compared to capacitor with general resistance | Stepped voltage test ΔC = −97% Compared to capacitor with general resistance |
|---|---|---|---|---|---|---|
| 6 | 0.2 | 20 | 1.0 | 10/10 | 1.46 | 1.2 |
| 7 | 0.2 | 30 | 0.7 | 10/10 | 1.4 | 1.28 |
| 8 | 0.2 | 40 | 0.5 | 10/10 | 1.35 | 1.32 |
| 9 | 0.2 | 50 | 0.4 | 10/10 | 1.44 | 1.35 |

In Table 2, the resistance (surface resistance: 25Ω/□) is set to about double that of the general resistance (surface resistance: 15Ω/□) of the conventional capacitor using PP film for the dielectric film. In Table 3, the resistance (surface resistance: 45Ω/□) is set to about three times that of the conventional capacitor. Samples are tested in the same way as in Table 1.

It is apparent from Tables 2 and 3 that the withstand voltage characteristic improves as the resistance of the metal-deposited electrode increases, leading to a higher withstand voltage.

As described above, in the metallization film capacitor of the present invention, pass rate a/b of the deposition pattern is set to not greater than 4.0, and preferably between 1.0 and 0.4, where 'a' is the fuse width and 'b' is the length of the divisional electrodes in the lengthwise direction of the metalized film in forming the metal-deposited electrode on the dielectric film containing inorganic filler. In other words, a wider fuse and a wider divisional electrode can cut off an area by pinpointed evaporation of the metal-deposited electrode by less energy. This improves self-maintaining performance and also improves withstand voltage. Accordingly, the capacitor of the present invention simultaneously achieves high heat resistance and high withstand voltage.

The first exemplary embodiment refers to the PEN film as the dielectric film containing inorganic filler. However, the present invention is not limited to the PEN film. The use of polyphenylene sulfate (PPS) and polyethylene terephthalate (PET) as a material for the dielectric film achieves the same effect.

Second Exemplary Embodiment

The second exemplary embodiment of the present invention is described below.

The second exemplary embodiment has a partially different structure for the metal-deposited electrode formed on the metalized film used in the metallization film capacitor, compared to that of the first exemplary embodiment described with reference to FIG. 1. Other components are the same as the first exemplary embodiment, and thus the same reference marks are given to omit their duplicate description. Only the point that differs is detailed below with reference to a drawing.

Figure 2:
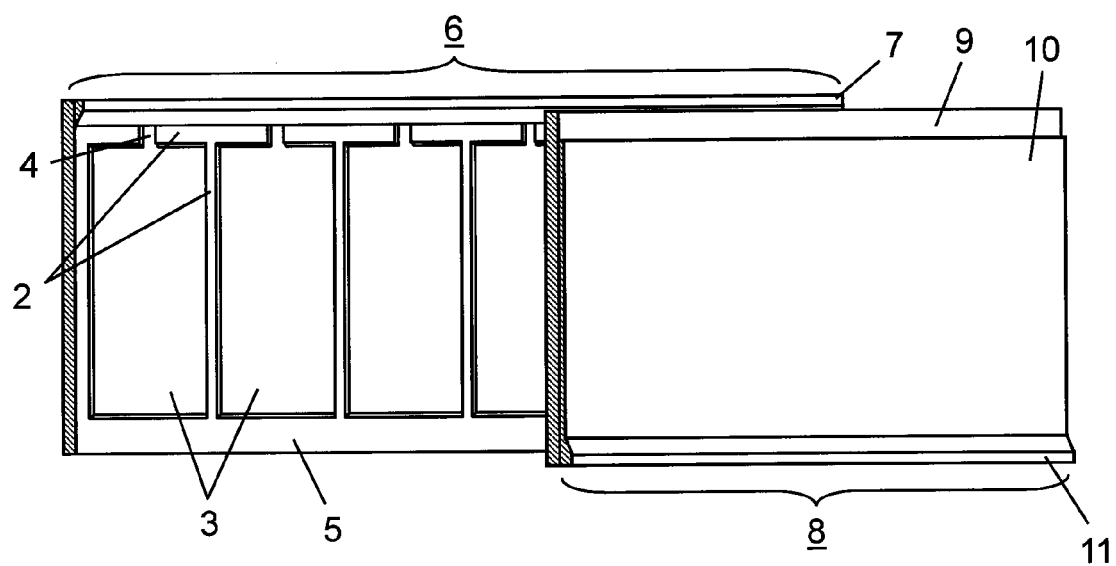
FIG. 2 is a plan view of a key part illustrating a state that a pair of metalized films is overlaid in a metallization film capacitor in accordance with a second exemplary embodiment of the present invention.

FIG. 2 is a plan view of a key part of a pair of metalized films in an overlaid state in a metallization film capacitor in the second exemplary embodiment of the present invention. In FIG. 2, same as metalized film 1 described in the first exemplary embodiment, first metalized film 6 has slit 2, which is a non-metal deposited portion, and aluminum metal-deposited electrodes to create multiple divisional electrodes 3. These divisional electrodes 3 are coupled in parallel by using fuse 4. Margin 5, which is a non-metal deposited portion, is provided on one widthwise end. Low resistance portion 7 is formed on an end opposite that of margin 5 by depositing aluminum.

Aluminum metal-deposited electrode 10 is formed on second metalized film 8, except for the area of margin 9, which is a non-metal deposited portion. Low resistance portion 11 made of aluminum is provided on an end opposite that of margin 9.

When first metalized film 6 and second metalized film 8, as configured above, are overlaid, fuse 4 provided on first metalized film 6 is configured not to be overlaid on metal-deposited electrode 10 of second metalized film 8 facing first metalized film 6. In general, the fuse operation is poor when the PEN film is used for the dielectric film configuring the metalized film, compared to that using popular PP film. When the fuse finally operates, a frequent short circuit occurs due to carbonization of the PEN film. The above structure, however, improves this disadvantage, achieving better fuse performance.

Low resistance portions 7 and 11 are provided with the aim of improving contact performance with the metalized contact electrode (not illustrated). For this purpose, the low resistance portions are preferably formed of zinc. However, if zinc is used, the zinc may spread out of the area at forming low resistance portions 7 and 11. This spread portion of zinc protruding from the position may deteriorate the self-healing (SH) performance, and result in activating fuse 4. Accordingly, it is preferable not to provide low resistance portions 7 and 11 if the PEN film is used. However, if low resistance portions 7 and 11 are provided, the aforementioned disadvantage is preventable by providing low resistance portions 7 and 11 made of aluminum, which is the same material as metal-deposited electrode 10, at positions that do not overlap with opposing divisional electrode 3 and metal-deposited electrode 10, respectively.

To confirm this effect, three types of samples using the PEN film for the dielectric film are prepared, and a capacity change rate is confirmed, as shown in Table 4. The three types are: Those without the low resistance portion, those with the low resistance portion made of zinc on the position that does not overlap with opposing divisional electrode and metal-deposited electrode, and those with the low resistance portion made of aluminum. In the test, DC voltage of 850 V is applied for one minute, and those whose capacity change rate exceeds −3% are counted as defectives.

TABLE 4

| | n = 50 | | |
|---|---|---|---|
| | No low resistance portion | Low resistance portion of aluminum | Low resistance portion of zinc |
| Samples whose capacity change rate exceeds −3% | 0 | 0 | 10 |

It is apparent from Table 4 that the capacity change rate of over −3% often occurs in the metallization film capacitor using the PEN film for the dielectric film and provided with the low resistance portion made of zinc. Contrarily, the metallization film capacitor without low resistance portion or with low resistance portion made of aluminum causes less change in capacity, with no defectives seen.

Third Exemplary Embodiment

The third exemplary embodiment of the present invention is described below.

Figure 3A:
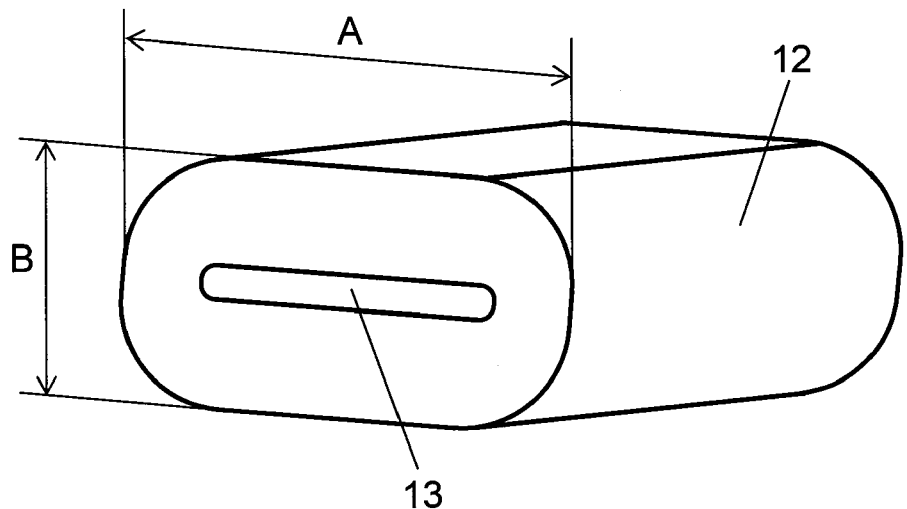
FIG. 3A is a perspective view of an element of a metallization film capacitor in accordance with a third exemplary embodiment of the present invention.
Figure 3B:
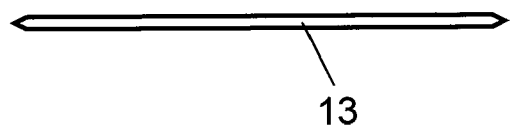
FIG. 3B is a front view of a defective core of the element.
Figure 3C:
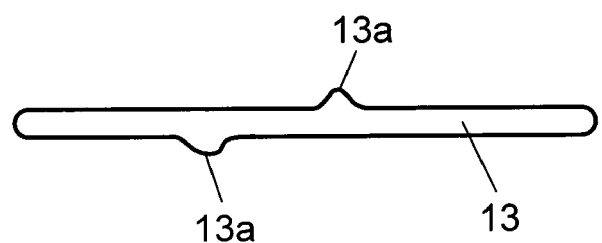
FIG. 3C is a front view of another defective core of the element.
Figure 4:
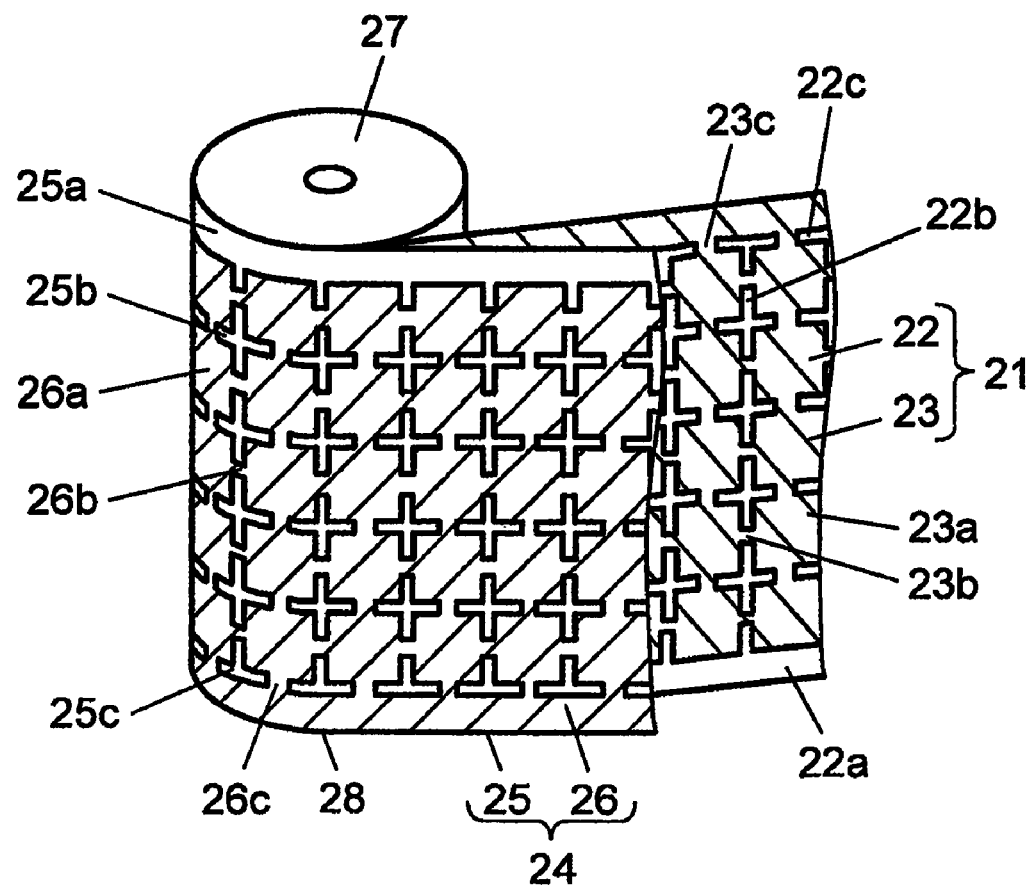
FIG. 4 is a perspective view of a structure of a conventional metallization film capacitor.

FIG. 3A is a perspective view of an element of a metallization film capacitor in the third exemplary embodiment of the present invention. FIG. 3B is a front view of a defective core of the element, and FIG. 3C is a front view of another defective core of the element. In FIGS. 3A to 3C, 'A' is a longer diameter of elliptically wound element 12 using a PEN film for a dielectric film, and 'B' is a shorter diameter.

In element 12 as configured above, cylindrical core 13 is first prepared, and the metalized film described in the first exemplary embodiment or the second exemplary embodiment is wound around this core 13, after which this cylindrical element 12 is pressed to form an oblate shape.

In this element 12, both ends of core 13 will be acute-angled, as shown in FIG. 3B, if core 13 is thin. Accordingly, the metalized film near this acute-angled portion will also be curved in an acute-angled manner. This results in the absence of filler in the PEN film configuring the metalized film. Accordingly, the capacity or withstand voltage may reduce, and furthermore, a short circuit may occur. Table 5 shows the capacity change rate in relation to the thickness of core 13. In the test, a DC voltage of 850 is applied for one minute, and those whose capacity change rate exceeds −3% are counted as defectives.

TABLE 5

| | n = 50 | | | | | |
|---|---|---|---|---|---|---|
| | Core thickness (mm) | | | | | |
| | 0.5 | 1.0 | 1.5 | 2.0 | 3.0 | 5.0 |
| Samples whose capacity change rate exceeds −3% | 7 | 5 | 2 | 0 | 0 | 0 |

It is apparent from Table 5 that the capacity change rate of over −3% often occurs if the thickness of core 13 is 1.5 mm or less. Contrarily, when the thickness of the core 13 is 2 mm or more, the capacity change rate is small, with no defectives seen.

As a result, the thickness of core 13 in the third exemplary embodiment is set to 2 mm or more.

In addition, when oblate rate A/B, in which 'A' is the longer diameter and 'B' is the shorter diameter of element 12, is large, core 13 that is pressed to an oblate shape becomes partially wrinkled, as shown in FIG. 3C. This may reduce capacity or withstand voltage.

Table 6 shows the capacity change rate in relation to oblate rate A/B. In the test, DC voltage of 850 V is applied for one minute, and those whose capacity change rate exceeds −3% are counted as defectives.

TABLE 6

| | n = 50 | | | | |
|---|---|---|---|---|---|
| | Oblate rate A/B | | | | |
| | 1 | 2 | 3 | 4 | 5 |
| Samples whose capacity change rate exceeds −3% | 0 | 0 | 0 | 3 | 5 |

It is apparent from Table 6 that the capacity change rate of over −3% often occurs if oblate rate A/B exceeds 3. Contrarily, when oblate rate A/B is 3 or less, the capacity change rate is small, with no defectives seen.

As a result, oblate rate A/B of element 12 is set to 3.0 or less in the third exemplary embodiment. This prevents wrinkling of core 13 pressed to the oblate shape, and thus element 12 of the metallization film capacitor that does not cause reduction in capacity or withstand voltage is achievable.

INDUSTRIAL APPLICABILITY

The metallization film capacitor of the present invention simultaneously achieves high heat resistance and high withstand voltage. Accordingly, the metallization film capacitor of the present invention is effectively applicable to capacitors for vehicles, in particular those which require resistance to demanding usage conditions.

The invention claimed is:

1. A metallization film capacitor comprising:
an element including a pair of metalized films, each of the metalized films including a metal-deposited electrode formed on a polyethylene naphthalate film containing inorganic filler, the pair of metalized films being one of stacked and wound such that the respective metal-deposited electrodes face each other via the polyethylene naphthalate film being sandwiched; and
a metalized contact electrode formed by spraying metal on both end faces of the element, wherein:
at least one of the metal-deposited electrodes on the pair of metalized films are divided into divisional electrodes and a current collective portion,
the divisional electrodes are physically separated from each other by slits,
each of all of the divisional electrodes has only one fuse,
each of all of the divisional electrodes is connected to the current collective portion via the only one fuse, and
a ratio a/b of a deposition pattern is not smaller than 0.5% and not greater than 0.7% where 'a' is a width of the fuse and 'b' is a length of each of the divisional electrodes in a lengthwise direction of the metalized films.

2. The metallization film capacitor of claim 1, wherein the fuse coupling the divisional electrodes is provided on an area in the opposing metalized films, the area being out of an area where the metal-deposited electrode is formed.

3. The metallization film capacitor of claim 1, wherein a low resistance section is provided on an area in each of the opposing metalized films, the area being out of an area where the divisional electrodes and the metal-deposited electrode are formed, the low resistance section having resistance lower than film resistance of the divisional electrodes and the metal-deposited electrode.

4. The metallization film capacitor of claim 1, wherein the element is a wound oblate element, and oblate rate A/B is not greater than 3.0, where 'A' is a longer diameter of the oblate element and 'B' is a shorter diameter of the oblate element.

5. The metallization film capacitor of claim 4, wherein a thickness of a core of the oblate element is not less than 2 mm.

6. The metallization film capacitor of claim 1, wherein the divisional electrodes are connected in electrically parallel to the current collective portion.

7. A metallization film capacitor comprising:
an element including a pair of metalized films, each of the metalized films including a metal-deposited electrode formed on a polyethylene naphthalate film containing inorganic filler, the pair of metalized films being one of stacked and wound such that the respective metal-deposited electrodes face each other via the polyethylene naphthalate film being sandwiched; and
a metalized contact electrode formed by spraying metal on both end faces of the element, wherein:
at least one of the metal-deposited electrodes on the pair of metalized films are divided into divisional electrodes and current collective portion by slits which are non-metal deposited portions,
the divisional electrodes are coupled to each other by using a fuse,
a ratio a/b of a deposition pattern is not smaller than 0.5% and not greater than 0.7% where 'a' is a width of the fuse and 'b' is a length of each of the divisional electrodes in a lengthwise direction of the metalized films,
each of divisional electrodes have plurality of sides along the slits, at least one of the plurality of sides being provided with one fuse,
the slits include a first slit provided perpendicular to a longitudinal direction of the metalized film and a second slit provided parallel to the longitudinal direction of the metalized film.

* * * * *